United States Patent
Falgén et al.

(10) Patent No.: US 6,576,213 B1
(45) Date of Patent: Jun. 10, 2003

(54) METHOD OF PRODUCING CHLORINE DIOXIDE

(75) Inventors: Helena Falgén, Sundsvall (SE); Johan Landfors, Sundsvall (SE); Kaj Kangasniemi, Sundsvall (SE)

(73) Assignee: EKA Chemicals, Inc., Stockholm (SE)

( * ) Notice: Subject to any disclaimer, the term of this patent is extended or adjusted under 35 U.S.C. 154(b) by 0 days.

(21) Appl. No.: 08/497,039

(22) Filed: Jun. 30, 1995

Related U.S. Application Data

(63) Continuation of application No. 08/228,279, filed on Apr. 15, 1994, now abandoned.

(30) Foreign Application Priority Data

Mar. 18, 1994 (SE) ............................................. 9400913

(51) Int. Cl.[7] ............................................. C01B 11/02
(52) U.S. Cl. ..................................... 423/478; 423/272
(58) Field of Search .............................. 423/478, 272, 423/273

(56) References Cited

U.S. PATENT DOCUMENTS

| | | | | |
|---|---|---|---|---|
| 1,958,204 A | * | 5/1934 | Reichert | 423/273 |
| 2,004,809 A | * | 6/1935 | Gilbert et al. | 423/273 |
| 2,332,181 A | * | 10/1943 | Soule | 423/478 |
| 2,833,624 A | * | 5/1958 | Sprauer | 423/478 |
| 3,114,606 A | * | 12/1963 | Meeker | 423/273 |
| 3,387,939 A | * | 6/1968 | Reilly et al. | 423/272 |
| 4,129,484 A | | 12/1978 | Larsson | 423/478 |
| 4,239,643 A | * | 12/1980 | Kowalski | 252/182 |
| 4,304,762 A | * | 12/1981 | Leigh | 423/272 |
| 4,421,730 A | * | 12/1983 | Isa et al. | 423/478 |
| 5,091,166 A | | 2/1992 | Engström et al. | 423/478 |
| 5,091,167 A | | 2/1992 | Engström et al. | 423/478 |
| 5,273,733 A | * | 12/1993 | Winters et al. | 423/477 |

FOREIGN PATENT DOCUMENTS

| | | | | |
|---|---|---|---|---|
| JP | 63-8203 | * | 1/1988 | ................ 423/478 |
| WO | WO93/21105 | | 10/1993 | |
| WO | WO93/25469 | | 12/1993 | |
| WO | WO93/25470 | | 12/1993 | |

OTHER PUBLICATIONS

Grant & Hackh's "Chemical Dictionary", Fifth Edition, Q 5 H3 1987, pp 277.*

"Aldrich" Chemical Company, Inc. Catalog, 1992, pp 690.*

* cited by examiner

Primary Examiner—Ngoc-Yen Nguyen
(74) Attorney, Agent, or Firm—David J. Serbin

(57) ABSTRACT

The invention relates to method of producing chlorine dioxide comprising the steps of: providing a reactor with an aqueous acidic reaction medium containing chlorate ions; reacting said chlorate ions with hydrogen peroxide as a reducing agent in such proportions that chlorine dioxide is formed; withdrawing the chlorine dioxide from the reaction medium; wherein the content of tin in the reaction medium at steady state is maintained below 20 mg Sn per kg reaction medium.

16 Claims, No Drawings

METHOD OF PRODUCING CHLORINE DIOXIDE

This disclosure is a continuation of patent application Ser. No. 08/228,279, filed Apr. 15, 1994.

The present invention relates to a method of producing chlorine dioxide from chlorate ions and hydrogen peroxide in an aqueous acidic reaction medium.

Chlorine dioxide used in aqueous solution is of considerable commercial interest, mainly in pulp bleaching, but also in water purification, fat bleaching, removal of phenols from industrial wastes etc. It is therefore desirable to provide processes in which chlorine dioxide can be efficiently produced.

There are numerous different processes for chlorine dioxide production. Most processes in commercial use involve continuous reaction of alkali metal chlorate in an acidic medium with a reducing agent such as hydrogen peroxide, methanol, chloride ions or sulfur dioxide, chlorine dioxide gas being withdrawn from the reaction medium. Generally, the acidity is provided by addition of sulfuric acid and the sulfate is withdrawn as a by-product in the form of solid alkali metal sulfate or dissolved in depleted reaction medium.

Hydrogen peroxide is a particularly effective reducing agent offering high reaction rate at low acidity. Thus, the U.S. Pat. Nos. 5,091,166 and 5,091,167 disclose processes for production of chlorine dioxide from alkali metal chlorate and hydrogen peroxide operated at subatmospheric pressure, International patent specification WO 93/21105 suggests that phosphonic acids increase the production rate of chlorine dioxide when hydrogen peroxide is used as a reducing agent, International patent specification WO 93/25470 discloses chlorine dioxide production from chloric acid and hydrogen peroxide, and EP patent application 94200268.4 discloses a process for production of chlorine dioxide from chlorate ions and hydrogen peroxide operated at substantially atmospheric pressure. The disclosure of the above patents and patent applications are incorporated herein by reference.

It has been found that use of hydrogen peroxide as a reducing agent results in foaming in the chlorine dioxide reactor, particularly in subatmospheric processes involving evaporation of water from the reaction medium. If too much foam forms, it takes up a great deal of the total volume of the reactor, decreasing the production of chlorine dioxide. International patent specification WO 93/25469 discloses that the foaming can be eliminated if the hydrogen peroxide is premixed with the chlorate solution fed to the reactor which, however, has been found not to be effective.

The object of the present invention is to provide a process of producing chlorine dioxide from chlorate ions and hydrogen peroxide with an acceptable degree of foaming in the reactor. It is normally not necessary to totally eliminate the foaming, but it is desirable to keep the degree of foaming as low as possible.

According to the invention, it has surprisingly been found that additives and impurities normally present in hydrogen peroxide greatly affect the foaming in chlorine dioxide reactors. Technical grade hydrogen peroxide always contains small amounts of stabilizers, the most common system being a combination of alkali metal stannate and one or several phosphorus compounds such as phosphonic acids or salts thereof. Typically, technical hydrogen peroxide contains from about 100 to about 1000 mg $Na_2SnO_3$ (from about 28 to about 558 mg Sn) per liter 50% $H_2O_2$-solution, and from about 200 to about 2000 mg of phosphonic acids or a salts thereof per liter 50% $H_2O_2$-solution.

The acidic environment in a chlorine dioxide reactor causes most tin to be oxidized to $Sn^{4+}$ which has been found to accumulate in the reaction medium of the reactor, building up rather high concentrations. It has also been found that the tin forms complexes with many organic phosphorus compounds, which complexes significantly increase the foaming. Even if some of the tin supplied with the hydrogen peroxide leaves the reactor with products and by-products, it has been found that the content in the reaction medium at steady state is sufficiently high to cause an unacceptable degree of foaming.

According to the invention, the problems of foaming are solved by a method of producing chlorine dioxide comprising the steps of: Providing a reactor with an aqueous acidic reaction medium containing chlorate ions; reacting said chlorate ions with hydrogen peroxide as a reducing agent in such proportions that chlorine dioxide is formed; withdrawing the chlorine dioxide from the reaction medium; wherein the content of tin in the reaction medium at steady state is maintained below 20 mg Sn per kg reaction medium. Preferably, the content of tin is maintained below about 15 mg Sn, most preferably below about 10 mg Sn, particularly preferably below about 5 mg Sn per kg reaction medium. The absolutely best results are achieved if the content of tin is maintained below about 1 mg Sn per kg reaction medium or if the process is performed in the substantial absence of tin in the reaction medium.

Suitably the process is continuous, thus involving continuous supply of chlorate ions and hydrogen peroxide. The chlorate ions can be added in the form of alkali metal chlorate, chloric acid or mixtures thereof. Any mineral acid can be used as an acid source but normally sulfuric acid is preferred. If both alkali metal chlorate and sulfuric acid are supplied to the reactor, alkali metal sulfate is preferably withdrawn, either as a solid salt cake or dissolved in depleted reaction medium leaving the reactor. Alkali metal sulfate withdrawn from the reactor may be used as a by-product, but can also be electrochemically acidified and recirculated to the reaction medium as an acid source, as described in U.S. Pat. 4,129,484 or EP patent application 94200267.6, the disclosure of which are incorporated herein by reference.

In order to keep the tin content in the reaction medium sufficiently low, the amount of tin compounds added with the hydrogen peroxide, such as sodium stannate, should be as low as possible. Suitably, the hydrogen peroxide solution supplied contains less than about 20 mg Sn per kg $H_2O_2$, preferably less than about 15 mg Sn per kg $H_2O_2$, most preferably less than about 10 mg Sn per kg $H_2O_2$, particularly less than about 5 mg Sn per kg $H_2O_2$. The absolutely best results are achieved if the hydrogen peroxide solution contains less than about 1 mg Sn per kg $H_2O_2$ or if it is substantially free from tin or tin compounds. If it is assumed that most of the tin is in the form of sodium stannate, 1 g Sn corresponds to about 1.8 g $Na_2SnO_3$. Preferably, the hydrogen peroxide is stabilized with one or more phosphonic acids or salts thereof, for example alkali metal salts, suitably in an amount from about 0.1 to about 10 g/liter hydrogen peroxide solution, preferably from about 1 to about 5 g/liter hydrogen peroxide solution. As examples of useful phosphonic acids the following can be mentioned: 1-hydroxyethylidene-1,1-diphosphonic acid, 1-aminoethane-1, 1-diphosphonic acid, aminotri (methylenephosphonic acid), ethylene diamine tetra (methylenephosphonic acid), hexamethylene diamine tetra (methylenephosphonic acid), diethylenetriamine penta (methylenephosphonic acid) and diethylenetriamine hexa (methylenephosphonic acid). A particularly preferred stabilizer is diethylenetriamine penta (methylenephosphonic acid) or salts thereof. It is to be understood that the phosphonic acids or salts thereof can be used in combination with other stabilizers as long as the content of tin is less than the values mentioned above.

It is also preferred that the hydrogen peroxide contains as small amounts as possible of organic impurities, for example rests of the working solution used in the production according the anthraquinone process. Preferably, the amount of organic impurities is less than about 150 mg per kg $H_2O_2$, most preferably less than about 100 mg per kg $H_2O_2$, particularly less than about 50 mg per kg $H_2O_2$.

If suitable, it is also possible to add other reducing agents such as methanol, formaldehyde, formic acid, sugar alcohols, sulfur dioxide and chloride.

It is also possible to add small amounts of catalysts to the reactor. Preferred catalysts belong to the groups VB-VIII, IB, IVA and VIIA of the Periodic Table of the elements. High activity can be achieved by compounds containing V, Nb, Cr, Mn, Fe, Ru, Os, Ni, Pd, Pt, Cu, Ag, Ge, Sn, Pb, Br, and I, either separate or in combinations.

Although not necessary, it is possible to add small amounts of chloride ions, preferably in the form of alkali metal chloride, so as to maintain the concentration thereof in the reaction medium within the range from about 0.001 up to about 0.8 moles/liter.

All known types of chlorine dioxide reactors may be used such as SVP®, Mathieson and others.

Any alkali metal such as sodium, potassium or mixtures thereof may be used. Normally sodium is preferred.

The reaction medium can be maintained at atmospheric pressure or subatmospheric pressure. Normally subatmospheric pressure is preferred, enabling higher concentration of chlorine dioxide without risk for explosion and also improving the yield. Suitably the pressure is from about 60 to about 600 mm Hg, preferably from about 60 to about 400 mm Hg, most preferably from about 75 to about 350 mm Hg. Preferably, the pressure and the temperature are set so to evaporate water to dilute the chlorine dioxide formed and withdrawn from the reaction medium.

The acidity is suitably from about 0.5 to about 14 N, preferably from about 1 to about 7 N, most preferably from about 2 to about 5 N. The temperature is preferably from about 15 to about 100° C., most preferably from about 30 to about 85° C.

In a preferred subatmospheric process, the production of chlorine dioxide is preferably performed in a single reaction vessel, generator—evaporator—crystallizer. A suitable reactor is an SVP® (single vessel process) reactor. The chlorate concentration in the reaction vessel can vary within wide limits, from a low concentration of about 0.25 M up to saturation, preferably from about 1.5 up to saturation, most preferably from about 2.5 M up to saturation. The reactants are added continuously to the reactor. Preferably, alkali metal chlorate is added in an amount of from about 1.5 to 2 tonne/tonne chlorine dioxide and hydrogen peroxide is preferably added in an amount from about 0.06 to about 0.6 tonne/tonne chlorate, suitably from about 0.16 to about 0.32 tonne/tonne chlorate, preferably from about 0.16 to about 0.22 tonnes/tonne chlorate. The acidity is suitably from about 0.5 to about 12 N, preferably from about 1 to about 7 N, most preferably from about 2 to about 5 N. The reaction is suitably operated at a temperature from about 50 to about 100° C., preferably from about 50 to about 75° C. and at a pressure below atmospheric pressure, preferably from about 60 to about 400 mm Hg. Then the reaction medium boils and water is evaporated in a sufficient amount to dilute the chlorine dioxide formed to a safe concentration. The acidity in the reactor can be adjusted by adding a mineral acid, preferably sulfuric acid, or by substitution part of or all the alkali metal chlorate with chloric acid. In the reactor, the alkali metal salt of the mineral acid can be continuously crystallized and separated in a suitable manner. However, it is also possible to operate the reactor under non-crystallizing conditions and withdrawing depleted reaction medium and transfer it to an electrochemical cell in which the depleted medium is acidified and recirculated to the chlorine dioxide reactor and thereby decreasing or eliminating the need for further addition of acids. (For further details, the above mentioned U.S. Pat. No. 4,129,484 and EP patent application 94200267 are referred to.)

In a preferred process at substantially atmospheric pressure, the production of chlorine dioxide can be performed by adding alkali metal chlorate, a mineral acid such as sulfuric acid or chloric acid and hydrogen peroxide to an aqueous reaction medium with a chlorate concentration of from about 0.05 moles/l to saturation, preferably from about 0.09 to about 3.75 moles/l, most preferably from about 0.09 to about 1.1 moles/l. It is particularly preferred if the chlorate concentration exceeds about 0.3 moles/l. The acidity in the reaction medium is suitably within the range of from about 4 to 14 N, preferably from about 6 to about 12 N, and most preferably from about 7.5 to about 10 N. Hydrogen peroxide is normally added in an amount of from about 0.06 to about 0.6 ton/ton chlorate, suitably from about 0.16 to about 0.32, preferably 0.16 to 0.22 ton/ton chlorate. Inert gas is preferably introduced into the reaction vessel to provide agitation of the reaction medium but most of all to dilute the produced chlorine dioxide to a safe concentration. The suitable amount of inert gas added is conventional, i.e. to maintain the partial pressure of the chlorine dioxide below about 100 mm Hg. The inert gas may be air, nitrogen, carbon dioxide or the process off-gas comprising oxygen and trace amounts of chlorine dioxide. The process is suitably operated at a temperature from about 35 to about 100° C., preferably from about 45 to about 70° C., and at a pressure from about 600 mm Hg to 900 mm Hg, preferably from about 720 to about 800 mm Hg. The reaction is a non-crystallizing reaction and a depleted reaction medium leaves the reactor without any substantial crystallization of alkali metal salts. The temperature and the pressure is suitable set so to maintain the reaction medium under non-boiling conditions.

The invention is further illustrated with the following example which, however, not is intended to limit the scope of the invention. If not otherwise stated, all percentages and parts refer to percent and parts by weight.

EXAMPLE

Test solutions were prepared from 19.6 g sulfuric acid, about 48.7 g sodium sulfate (giving a saturated solution) and 27.1 g 50% hydrogen peroxide solution. In the different samples, the hydrogen peroxide used contained different kinds of additives. 100 ml of each sample were poured into a tube with a diameter of 60 mm. 300 l nitrogen gas per hour was bubbled through every sample and the volume of foam in ml was measured. The results appear in the table below. The contents of the additives refer to g/liter of the 50% hydrogen peroxide solution used.

| Additive 1 | Content | Additive 2 | Content | Foam volume |
| --- | --- | --- | --- | --- |
| — | — | — | — | 300 |
| 1-hydroxyethylidene-1,1-diphosphonic acid | 1 | — | — | 350 |

-continued

| Additive 1 | Content | Additive 2 | Content | Foam volume |
|---|---|---|---|---|
| diethylenetriamine penta (methylene-phosphonic acid) | 1 | sodium stannate | 0.5 | 450 |
| 1-hydroxyethylidene-1,1-diphosphonic acid | 1 | sodium stannate | 0.5 | 550 |

What is claimed is:

1. A continuous method of producing chlorine dioxide comprising the steps of (a) providing a reactor with an aqueous acidic reaction medium containing chlorate ions; (b) continuously adding to the reaction medium hydrogen peroxide stabilized with a stabilizer selected from the group consisting of 1-hydroxy-ethylidene-1,1-diphosphonic acid, 1-aminoethane-1,1-diphosphonic acid, aminotri (methylenephosphonic acid), ethylene diamine tetra (methylenephosphonic acid), hexamethylene diamine tetra (methylenephosphonic acid), diethylenetriamine penta (methylenephosphonic acid), diethylenetriamine hexa (methylenephosphonic acid), salts thereof and mixtures thereof, said stabilized hydrogen peroxide containing less than about 20 mg Sn per kg hydrogen peroxide; (c) reacting said chlorate ions with hydrogen peroxide as a reducing agent in such proportions that chlorine dioxide is formed; and (d) withdrawing chlorine dioxide from the reaction medium, wherein the hydrogen peroxide continuously added to the reaction medium is substantially free from tin or tin compounds or contains less than about 15 mg Sn per kg $H_2O_2$.

2. A method as claimed in claim 1, wherein the hydrogen peroxide continuously added to the reaction medium is substantially free from tin or tin compounds or contains less than about 10 mg Sn per kg $H_2O_2$.

3. A method as claimed in claim 1, wherein the hydrogen peroxide continuously added to the reaction medium is substantially free from tin or tin compounds or contains less than about 5 mg Sn per kg $H_2O_2$.

4. A method as claimed in claim 1, wherein the hydrogen peroxide continuously added to the reaction medium is substantially free from tin or tin compounds or contains less than about 1 mg Sn per kg $H_2O_2$.

5. A method as claimed in claim 1, wherein the hydrogen peroxide continuously added to the reaction medium is substantially free from tin or tin compounds.

6. A method as claimed in claim 1, wherein step (c) includes simultaneously maintaining an acceptably low degree of foaming and a concentration of tin or tin compounds in the reaction medium at steady state below about 15 mg Sn per kg of reaction medium.

7. A method as claimed in claim 1, wherein the concentration of tin or tin compounds in the reaction medium at steady state is maintained below about 10 mg Sn per kg of reaction medium.

8. A method as claimed in claim 1, wherein the concentration of tin or tin compounds in the reaction medium at steady state is maintained below about 5 mg Sn per kg of reaction medium.

9. A method as claimed in claim 1, wherein the reaction medium at steady state is substantially free from tin or tin compounds.

10. A method as claimed in claim 1, wherein the hydrogen peroxide continuously added to the reaction medium is stabilized with a stabilizer selected from the group consisting of aminotri(methylenephosphonic acid), at least one salt thereof, and mixtures thereof.

11. A method as claimed in claim 1, wherein the hydrogen peroxide continuously added to the reaction medium is stabilized with a stabilizer selected from the group consisting of diethylenetriamine penta(methylenephosphonic acid), at least one salt thereof, and mixtures thereof.

12. A method as claimed in claim 1, wherein the reaction medium is maintained at a pressure from about 60 to about 600 mm Hg and water is evaporated to dilute the chlorine dioxide formed.

13. A method as claimed in claim 1, wherein the step of reducing said chlorate ions with hydrogen peroxide as a reducing agent includes producing chlorate ions with at least one additional reducing agents selected from the group consisting of methanol, formaldehyde, formic acid, a sugar alcohol, sulfur dioxide, and chloride.

14. A method as claimed in claim 1, further including the step of adding a catalyst to the aqueous acidic reaction medium.

15. A method as claimed in claim 1, wherein the reaction medium is maintained at a pressure from about 600 to about 900 mm Hg.

16. A method as claimed in claim 1, wherein the method is carried out in the substantial absence of crystallization of alkali metal salts.

* * * * *